United States Patent
Kim et al.

(10) Patent No.: US 9,131,494 B2
(45) Date of Patent: Sep. 8, 2015

(54) METHOD FOR BACKHAUL SUBFRAME SETTING BETWEEN A BASE STATION AND A RELAY NODE IN A WIRELESS COMMUNICATION SYSTEM AND A DEVICE THEREFOR

(75) Inventors: Hakseong Kim, Anyang-si (KR); Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 13/643,269

(22) PCT Filed: May 6, 2011

(86) PCT No.: PCT/KR2011/003388
§ 371 (c)(1),
(2), (4) Date: Oct. 24, 2012

(87) PCT Pub. No.: WO2011/139114
PCT Pub. Date: Nov. 10, 2011

(65) Prior Publication Data
US 2013/0039254 A1   Feb. 14, 2013

Related U.S. Application Data

(60) Provisional application No. 61/332,202, filed on May 7, 2010.

(51) Int. Cl.
*H04W 72/04* (2009.01)
*H04B 7/155* (2006.01)
*H04W 84/04* (2009.01)

(52) U.S. Cl.
CPC ....... *H04W 72/0426* (2013.01); *H04B 7/15542* (2013.01); *H04W 84/047* (2013.01)

(58) Field of Classification Search
CPC .................. H04W 72/0426; H04B 7/15542
USPC .................................................. 370/312, 315
See application file for complete search history.

(56) References Cited

U.S. PATENT DOCUMENTS

| | | | |
|---|---|---|---|
| 2010/0080139 A1 | 4/2010 | Palanki et al. | |
| 2010/0110964 A1 | 5/2010 | Love et al. | |
| 2011/0103291 A1* | 5/2011 | Wiberg et al. | 370/315 |
| 2011/0228700 A1* | 9/2011 | Mildh et al. | 370/254 |
| 2012/0026954 A1* | 2/2012 | Wang et al. | 370/329 |
| 2012/0195226 A1* | 8/2012 | Liu et al. | 370/252 |
| 2012/0274513 A1* | 11/2012 | Le Bars et al. | 342/368 |

OTHER PUBLICATIONS

Peters et al., "The Future of WiMAX: Multihop Relaying with IEEE 802.16j," IEEE Communications Magazine, Jan. 2009, pp. 104-111.

\* cited by examiner

*Primary Examiner* — Donald Mills
*Assistant Examiner* — Henry Baron
(74) *Attorney, Agent, or Firm* — Birch, Stewart, Kolasch & Birch, LLP

(57) ABSTRACT

Disclosed is a method whereby a relay node receives a signal from a base station in a wireless communication system. More specifically, the invention comprises: a step in which a relay node receives, from the base station, a request signal for changing the size of a downlink physical control channel transmitted to a terminal corresponding to the relay node; a step in which a signal in response to the request signal is sent to the base station; a step of setting a downlink available symbol between the base station and the relay node, based on the request signal; and a step in which a relay node specific signal, sent from the base station, is received from the downlink available symbol.

7 Claims, 12 Drawing Sheets

FIG. 2
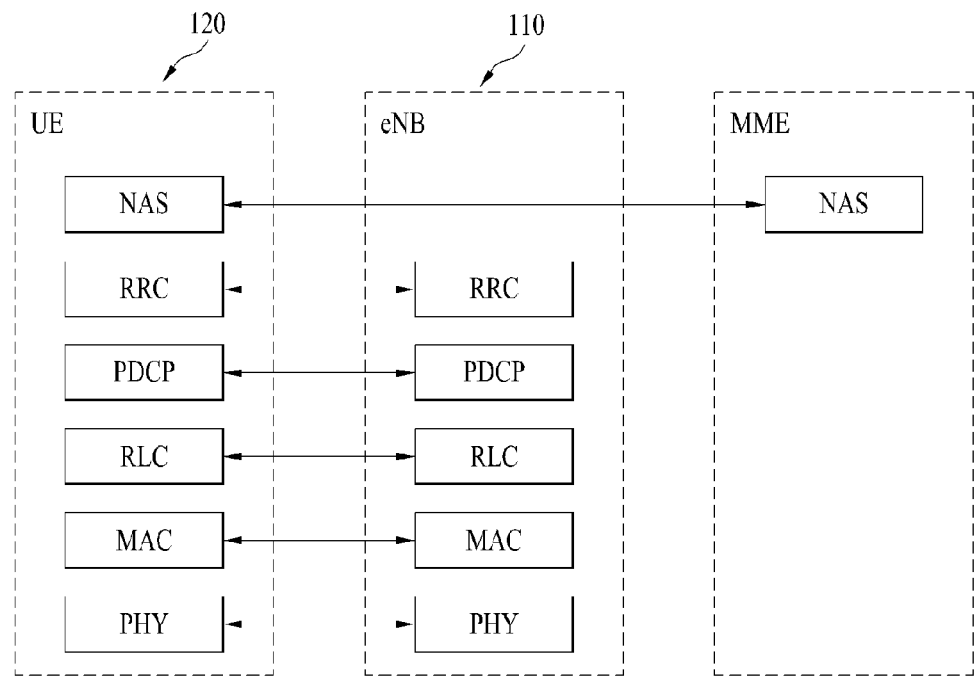
(a) Control-Plane Protocol Stack
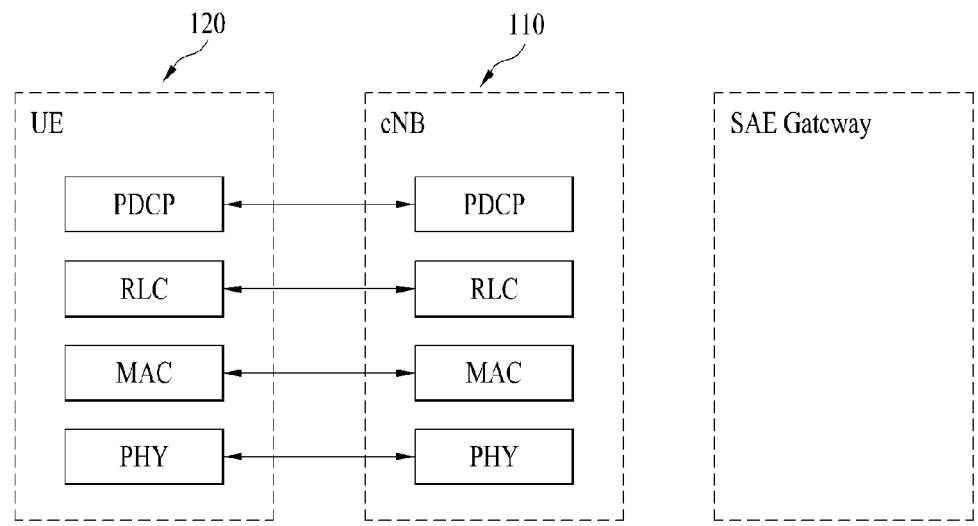
(b) User-Plane Protocol Stack

METHOD FOR BACKHAUL SUBFRAME SETTING BETWEEN A BASE STATION AND A RELAY NODE IN A WIRELESS COMMUNICATION SYSTEM AND A DEVICE THEREFOR

CROSS REFERENCE TO RELATED APPLICATIONS

This application is the National Phase of PCT/KR2011/003388 filed on May 6, 2011, which claims priority under 35 U.S.C. 119(e) to U.S. Provisional Application No. 61/332,202 filed on May 7, 2010, all of which are hereby expressly incorporated by reference into the present application.

TECHNICAL FIELD

The present invention relates to a wireless communication system and more particularly to a method and apparatus for setting a backhaul subframe between a base station and a relay node in a wireless communication system.

BACKGROUND ART

A 3rd Generation Partnership Project Long Term Evolution (3GPP LTE) communication system, which is an exemplary wireless communication system to which the present invention may be applied, will now be described in brief.

FIG. 1 is a diagram schematically showing a network structure of an Evolved Universal Mobile Telecommunications System (E-UMTS) as an exemplary wireless communication system. The E-UMTS system has evolved from the conventional UMTS system and basic standardization thereof is currently underway in the 3GPP. The E-UMTS may be generally referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although wireless communication technology has been developed up to LTE based on Wideband Code Division Multiple Access (WCDMA), the demands and expectations of users and providers continue to increase. In addition, since other wireless access technologies continue to be developed, new technology is required to secure competitiveness in the future. For example, decrease of cost per bit, increase of service availability, flexible use of a frequency band, simple structure, open interface, and suitable power consumption by a UE are required.

DISCLOSURE

Technical Problem

In view of the above discussion, the present invention suggests a method and apparatus for setting a backhaul subframe between a base station and a relay node in a wireless communication system.

Technical Solution

A method for a relay node to receive a signal from a base station in a wireless communication system in accordance of one aspect of the present invention includes receiving, from the base station, a request signal for changing a size of a downlink physical control channel that is transmitted from the relay node to a user equipment corresponding to the relay node, transmitting a response signal to the base station in response to the request signal, setting a downlink available symbol between the base station and the relay node based on the request signal, and receiving, from the downlink available symbol, a relay node specific signal transmitted from the base station.

A relay node in a wireless communication system in accordance of another aspect of the present invention includes a wireless communication module for communicating with a base station through a first link and communicating with a user equipment corresponding to the relay node through a second link and a processor for processing a signal that is transmitted or received through the first link and a signal that is transmitted or received through the second link, wherein the wireless communication module receives a request signal for changing a size of a downlink physical control channel corresponding to the second link from the base station and transmits a response signal to the base station in response to the request signal, the processor sets a downlink available symbol of the first link based on the request signal, and the wireless communication module receives a relay node specific signal, which is transmitted through the first link, from the downlink available symbol.

Here, a normal subframe and a Multicast Broadcast Single Frequency Network (MBSFN) subframe may be alternately set as a downlink subframe of the second link.

The request signal includes information regarding the number of symbols of a downlink physical control channel that is transmitted to a user equipment corresponding to the relay node or includes information regarding a Physical Hybrid-ARQ Indicator CHannel (PHICH) duration of a subframe that is transmitted to a user equipment corresponding to the relay node.

Preferably, the response signal is 1-bit information regarding possibility of change to the size of the downlink physical control channel.

Alternatively, the response signal includes information regarding the number of antenna ports for a common reference signal allocated to a subframe that is transmitted to a user equipment corresponding to the relay node or information regarding the number of transmit antennas of the relay node.

Advantageous Effects

According to the embodiments of the present invention, a base station and a relay node can efficiently transmit and receive signals in a wireless communication system.

Advantages of the present invention are not limited to those described above and other advantages will be clearly understood by those skilled in the art from the following description.

DESCRIPTION OF DRAWINGS

FIG. 2 illustrates structures of a control plane and a user plane of a radio interface protocol between a UE and E-UTRAN based on the 3GPP radio access network standard.

BEST MODE

Figure 1:
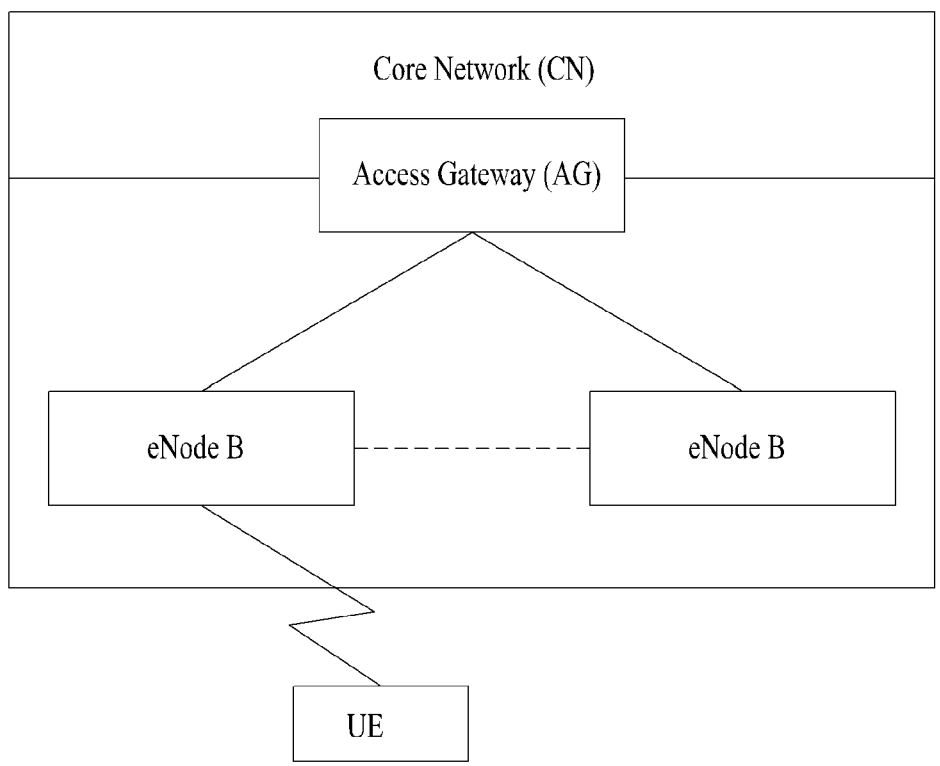
FIG. 1 schematically illustrates a network structure of an E-UMTS as an exemplary wireless communication system.

The above and other configurations, operations, and features of the present invention will be easily understood from embodiments of the present invention, which are described below with reference to the accompanying drawings. The embodiments described below are examples in which the features of the present invention are applied to a 3GPP system.

Although this specification describes embodiments of the present invention using an LTE system and an LTE-A system, the present invention may be applied to any communication system that is defined above. In addition, although this specification will describes embodiments of the present invention with reference to an FDD scheme, the embodiments of the present invention are just exemplary and may be easily modified to be applied to an H-FDD scheme or a TDD scheme.

FIG. 2 is a diagram showing structures of a control plane and a user plane of a radio interface protocol between a UE and E-UTRAN based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer of an upper layer via a transport channel. Data is transported between the MAC layer and the PHY layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. User traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
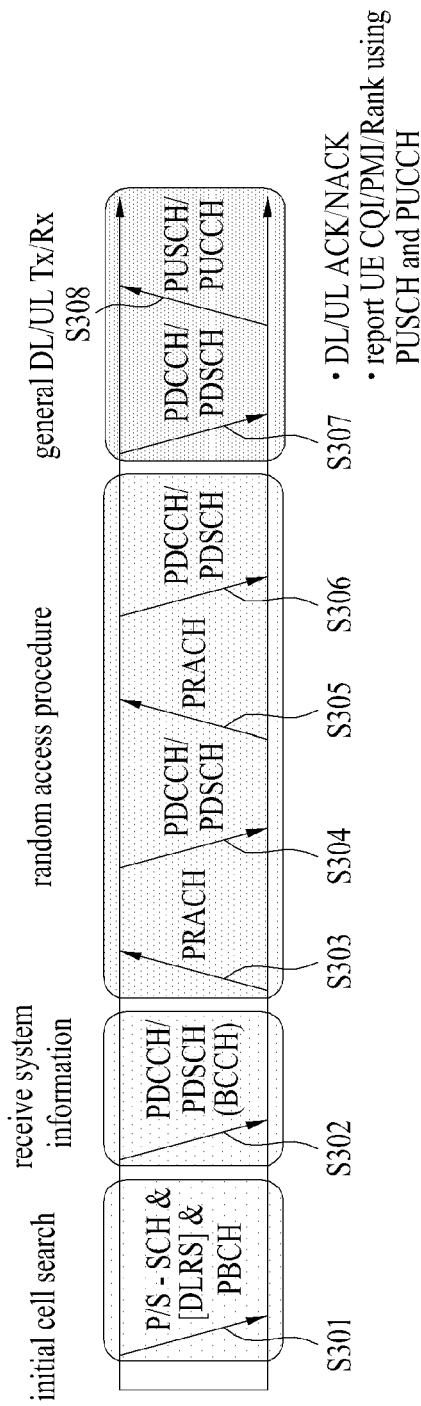
FIG. 3 illustrates physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (S307) and transmit a Physical Uplink Shared Channel (PUSCH)/Physical Uplink Control Channel (PUCCH) (S308) according to a general uplink/downlink signal transmission procedure. Specifically, the UE receives a Downlink Control Information DCI) through a PDCCH. Here, the DCI includes control information such as resource allocation information of the UE and the format of the DCI varies according to the purpose of use of the DCI.

Control information that the UE transmits to the eNB in uplink or receives from the eNB include a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI, PMI, or RI through a PUSCH and/or a PUCCH.

Figure 4:
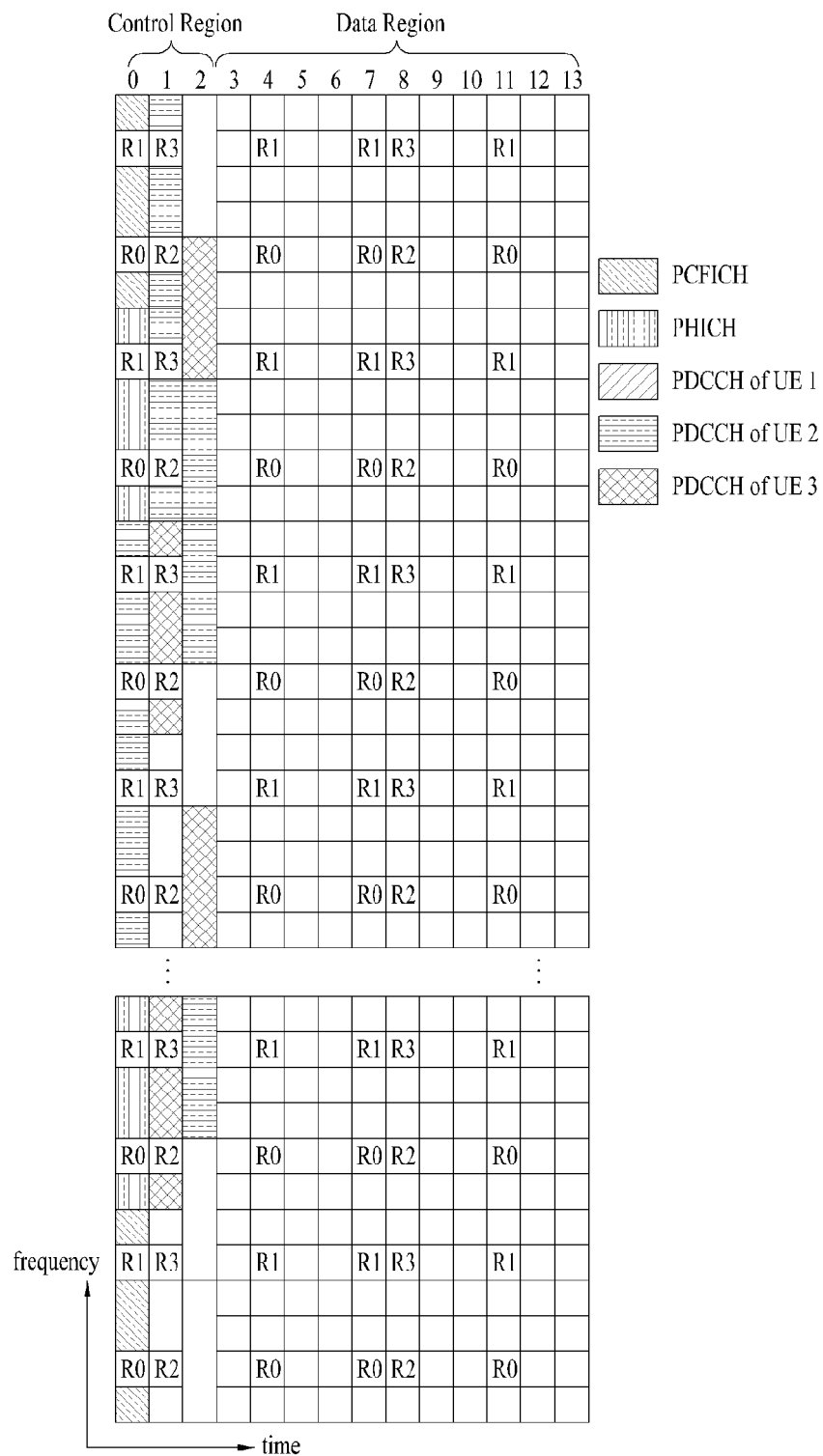
FIG. 4 illustrates the structure of a downlink radio frame used in an LTE system.

FIG. 4 illustrates a control channel included in a control region of one subframe in a downlink radio frame.

As shown in FIG. 4, a subframe includes 14 OFDM symbols. First 1 to 3 OFDM symbols of the subframe are used as a control region and the remaining 13 to 11 OFDM symbols are used as a data region according to setting of the subframe. In FIG. 4, R1 to R4 denote Reference Signals (RSs) or pilot signals for antennas 0 to 3. The RSs are fixed in a specific pattern within the subframe regardless of the control region and the data region. A control channel is allocated to resources in the control region to which no RS has been allocated and a traffic channel is allocated to resources in the data region to which no RS has been allocated. Examples of the control channel allocated to the control region include a Physical Control Format Indicator CHannel (PCFICH), a Physical Hybrid-ARQ Indicator CHannel (PHICH), and a Physical Downlink Control CHannel (PDCCH).

The PCFICH, which is a physical control format indicator channel, notifies the UE of the number of OFDM symbols which are used in a PDCCH every subframe. The PCFICH is located at the first OFDM symbol and is preferentially set in a PHICH and a PDCCH. The PCFICH includes 4 Resource Element Groups (REGs), each of which is distributed in the control region based on a Cell IDentity (ID). One REG includes 4 Resource Elements (REs). An RE is the minimum physical resource which is defined as 1 subcarrier×1 OFDM symbol. The PCFICH value indicates a value in a range from 1 to 3 or a range from 2 to 4 according to bandwidth and is modulated according to Quadrature Phase Shift Keying (QPSK).

The PHICH, which is a physical Hybrid—Automatic Repeat and reQuest (HARQ) indicator channel, is used to carry a HARQ ACK/NACK. That is, the PHICH is a channel for transmitting DL ACK/NACK information for HARQ. The PHICH includes 1 REG and is scrambled in a cell-specific manner. The ACK/NACK is indicated by 1 bit and is modulated according to Binary Phase Shift Keying (BPSK). The modulated ACK/NACK is spread with a spreading Factor (SF) of 2 or 4. PHICHs mapped to the same resource form a group. The number of PHICHs multiplexed in the PHICH group is determined according to the number of spreading codes. The PHICH (group) is repeated 3 times in order to achieve diversity gain in the frequency domain and/or the time domain. The PHICH or PHICH group lasts a duration corresponding to a specific number of symbols in one subframe, which is referred to as a PHICH duration. The PHICH duration is signaled from a higher layer and may be defined as shown in the following Table 1.

TABLE 1

| PHICH duration | Normal subframes | MBSFN subframes |
| --- | --- | --- |
| Normal | 1 | 1 |
| Extended | 3 | 2 |

A PDCCH, which is a physical downlink control channel, is allocated to the first n OFDM symbols of the subframe. Here, n, which is an integer of 1 or greater, is indicated by the PCFICH. The PDCCH includes one or more CCEs. The PDCCH notifies each UE or UE group of information associated with resource allocation of a paging channel (PCH) and a downlink-shared channel (DL-SCH), which are transport channels, an uplink scheduling grant, HARQ information, and the like. The PCH and the DL-SCH are transmitted through a PDSCH. Thus, the eNB and the UE generally transmit and receive data other than specific control information and specific service data through the PDSCH.

Information indicating a UE(s), to which data of the PDSCH is to be transmitted, information indicating how the UE(s) is to receive and decode the PDSCH data, and the like are transmitted within the PDCCH. For example, let us assume that a specific PDCCH is CRC-masked with a Radio Network Temporary Identity (RNTI) which is referred to as "A", information regarding data, which is transmitted using a radio resource (for example, a frequency position) which is referred to as "B" and transmission format information (for example, a transport block size, a modulation scheme, coding information, etc.) which is referred to as "C", is transmitted through a specific subframe. In this case, a UE in a cell monitors a PDCCH using RNTI information, which the UE has, and, if one or more UEs have RNTI "A", the UEs receive a PDCCH and receive a PDSCH indicated by "B" and "C" through the received PDCCH.

On the other hand, when a channel between an eNB and a UE is in a bad condition in a wireless network, a Relay Node (RN) may be installed between the eNB and the UE to provide a radio channel with higher quality to the UE. In addition, an RN may be used in a cell edge area in which a channel from an eNB is in a bad condition to provide a high-speed data channel and to extend the cell service area. Thus, RNs are being widely used in wireless communication systems for eliminating blind zones.

While the conventional relay schemes are limited to the repeater function that simply amplifies and transmits signals, more intelligent relay schemes have recently been developed. Relay technology is essential to increase service coverage and data throughput while reducing the costs of extensive installation of eNBs and the costs of backhaul network maintenance in next-generation mobile communication systems. As relay technology gradually develops, new wireless communication systems need to support RNs used in conventional wireless communication systems.

In a 3rd Generation Partnership Project Long Term Evolution (3GPP LTE) system, as an RN has adopted a function to forward link connection between a base station and a User Equipment (UE), two types of links having different attributes have been respectively applied to uplink and downlink carrier frequency bands. A connection link set between an eNB and an RN is defined as a backhaul link. Frequency Division Duplex (FDD) or Time Division Duplex (TDD) transmission using downlink resources is referred to as backhaul downlink and FDD or TDD transmission using uplink resources is referred to as backhaul uplink.

Figure 5:
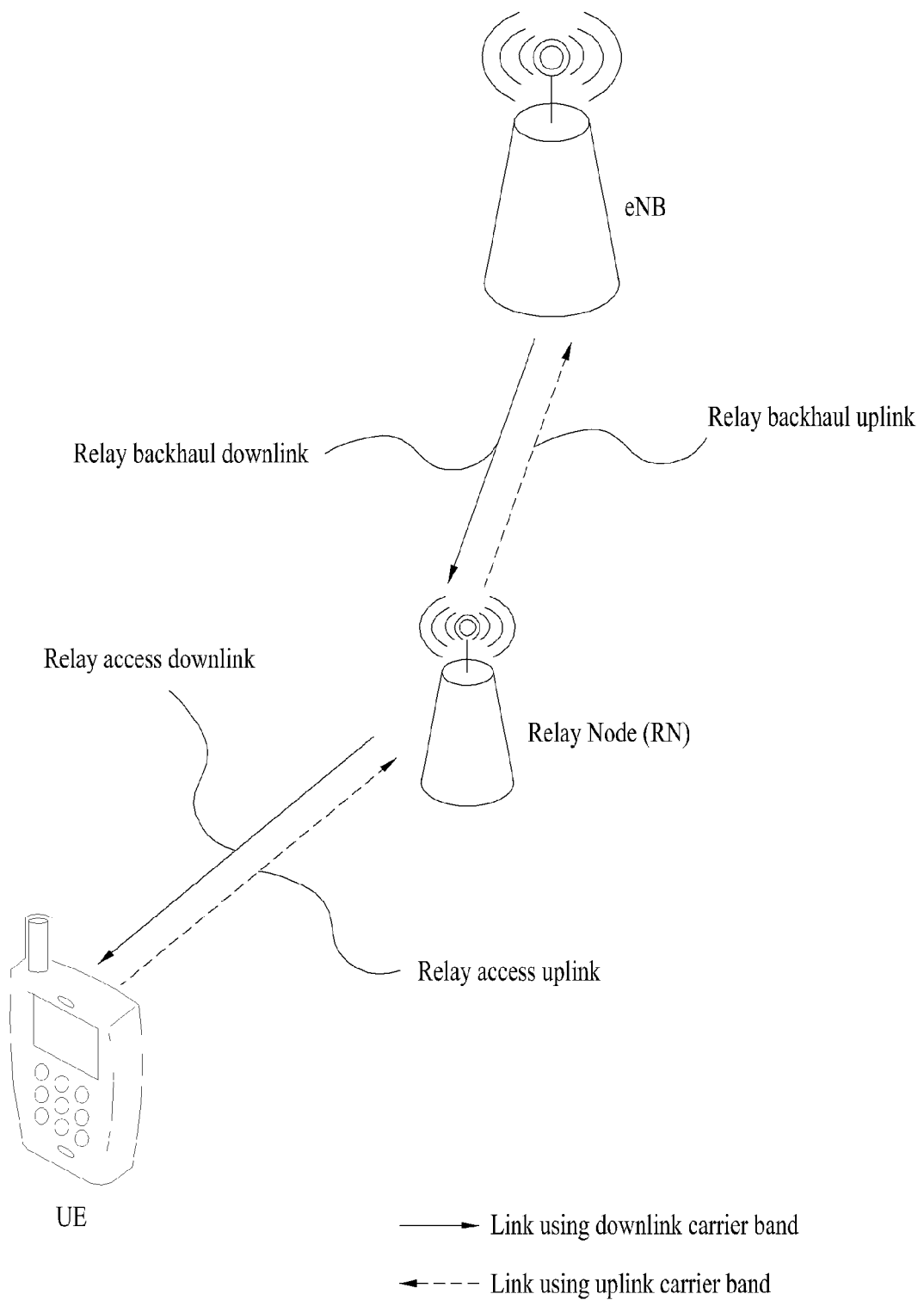
FIG. 5 illustrates a configuration of a relay backhaul link and a relay access link in a wireless communication system.

FIG. 5 illustrates a configuration of a relay backhaul link and a relay access link in a wireless communication system.

As an RN has been introduced to serve to forward link connection between an eNB and a UE, two types of links having different attributes have been respectively applied to uplink and downlink carrier frequency bands as shown in FIG. 5. A connection link set between an eNB and an RN is defined as a relay backhaul link. A backhaul link in which transmission is performed using downlink frequency band resources (in the case of frequency Division Duplex (FDD)) or using downlink subframe resources (in the case of Time Division Duplex (TDD)) may be referred to as a "backhaul downlink" and a backhaul link in which transmission is performed using downlink frequency band resources (in the case of FDD) or using downlink subframe resources (in the case of TDD) may be referred to as a "backhaul uplink".

On the other hand, a connection link set between an RN and a series of UEs is defined as a relay access link. A relay access link in which transmission is performed using downlink frequency band resources (in the case of FDD) or using downlink subframe resources (in the case of TDD) may be referred to as an "access downlink" and a relay access link in which transmission is performed using downlink frequency band resources (in the case of FDD) or using downlink subframe resources (in the case of TDD) may be referred to as an "access uplink".

The RN may receive information from an eNB through a relay backhaul downlink and may transmit information to a base station through a relay backhaul uplink. The RN may transmit information to a UE through the relay access downlink and may receive information from a UE through the relay access uplink.

The case in which a band (or spectrum) of the RN is used when the backhaul link operates in the same frequency band as the access link is referred to as "in-band" and the case in which a band (or spectrum) of the RN is used when the backhaul link and the access link operate in different frequency bands is referred to as an "out-band". In both in-band and out-band cases, a UE which operates according to the existing LTE system (e.g., Release-8) (hereinafter, referred to as a legacy UE) needs to be able to be connected to the donor cell.

The RN may be classified into a transparent RN or a non-transparent RN depending on whether or not the UE recognizes the RN. The term "transparent" indicates that the UE cannot determine whether or not the UE is performing communication with the network through the RN and the term "non-transparent" indicates that the UE can determine whether or not the UE is performing communication with the network through the RN.

In association with control of the RN, the RN may be classified into an RN that is configured as a part of the donor cell or an RN that controls the cell by itself.

While the RN configured as a part of the donor cell may have an RN ID, the RN does not have its own cell identity. When at least a part of a Radio Resource Management (RRM) unit of the RN is controlled by the eNodeB to which the donor cell belongs (even when the remaining parts of the RRM are located at the RN), the RN is referred to as being configured as a part of the donor cell. Preferably, such an RN can support a legacy UE. Examples of such an RN include various types of RNs such as smart repeaters, decode-and-forward RNs, L2 (second layer) RNs, and Type-2 RNs.

On the other hand, the RN that controls the cell by itself controls one or more cells, unique physical layer cell identities are provided respectively to cells controlled by the RN, and the same RRM mechanism may be used for the cells. From the viewpoint of the UE, there is no difference between access to the cell controlled by the RN and access to the cell controlled by a general eNodeB. Preferably, the cell controlled by such an RN may support a legacy UE. Examples of such an RN include self-backhauling RNs, L3 (third layer) RNs, Type-1 RNs, and Type-1a RNs.

The Type-1 RN is an in-band RN that controls a plurality of cells, each of which appears to be an individual cell different from the donor cell from the viewpoint of the UE. In addition, each of the plurality of cells has a respective physical cell ID (which is defined in LTE Release-8) and the RN may transmit its synchronization channel, RSs, etc. In the case of a single-cell operation, the UE may directly receive scheduling information and HARQ feedback from the RN and transmit its own control channel (associated with Scheduling Request (SR), CQI, ACK/NACK, etc.) to the RN. In addition, the Type-1 RN appears as a legacy eNodeB (which operates according to the LTE Release-8 system) to a legacy UE (which operates according to the LTE Release-8 system). That is, the Type-1 RN has backward compatibility. The Type-1 RN appears as an eNodeB different from the legacy eNodeB to UEs which operates according to the LTE-A system, thereby providing performance improvement.

The Type-1a RN has the same characteristics as the above-described Type-1 RN except that Type-1a RN operates as an out-band RN. The Type-1a RN may be configured so as to minimize or eliminate an influence of the operation thereof on an L1 (first layer) operation.

The Type-2 RN is an in-band RN and does not have a separate physical cell ID. Thus, the Type-2 RN does not form a new cell. The Type-2 RN is transparent to the legacy UE such that the legacy UE cannot determine the presence of the Type-2 RN. Although the Type-2 RN can transmit a PDSCH, the Type-2 RN does not transmit at least a CRS and a PDCCH.

In order to enable the RN to operate as the in-band RN, some resources in the time-frequency space need to be reserved for the backhaul link and may be configured so as not to be used for the access link. This is referred to as resource partitioning.

The general principle of resource partitioning in the RN may be explained as follows. The backhaul downlink and the access downlink may be multiplexed in one carrier frequency using a Time Division Multiplexing (TDM) scheme (that is, only one of the backhaul downlink or the access downlink is activated in a specific time). Similarly, the backhaul uplink and the access uplink may be multiplexed in one carrier frequency using the TDM scheme (that is, only one of the backhaul uplink or the access uplink is activated in a specific time).

The multiplexing of the backhaul link using an FDD scheme may be described as a procedure in which backhaul downlink transmission is performed in a downlink frequency band and backhaul uplink transmission is performed in an uplink frequency band. The multiplexing of the backhaul link using a TDD scheme may be described as a procedure in which backhaul downlink transmission is performed in a downlink subframe of the eNodeB and the RN and backhaul uplink transmission is performed in an uplink subframe of the eNodeB and the RN.

For example, if backhaul downlink reception from the eNodeB and access downlink transmission to the UE are simultaneously performed in a predetermined frequency band when the RN is an in-band RN, a signal transmitted from the transmitter of the RN may be received by the receiver of the RN and thus signal interference or RF jamming may occur in the RF front end of the RN. Similarly, if access uplink reception from the UE and backhaul uplink transmission to the eNodeB are simultaneously performed in a predetermined frequency band, signal interference may occur in the RF front end of the RN. Accordingly, it is difficult to implement simultaneous transmission and reception in one frequency band at the RN unless the received signal and the transmitted signal are sufficiently separated (for example, unless the transmit antennas and the receive antennas are installed at sufficiently separated positions (for example, above or under the ground)).

In one method for solving such signal interference, the RN operates so as not to transmit a signal to the UE while a signal is being received from the donor cell. That is, a gap may be generated in transmission from the RN to the UE and may be set so as not to expect any transmission from the RN to the UE (including the legacy UE) during the gap. Such a gap may be set by configuring a Multicast Broadcast Single Frequency Network (MBSFN) subframe.

Figure 6:
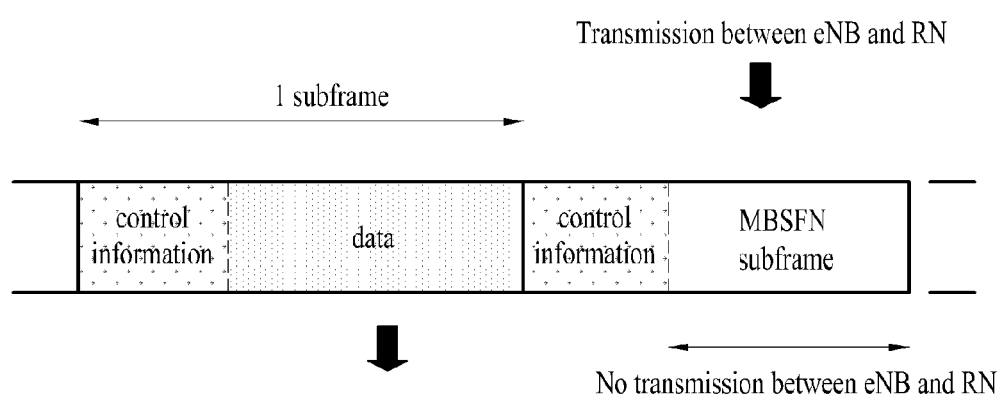
FIG. 6 illustrates exemplary RN resource division.

FIG. 6 illustrates exemplary RN resource division.

In the example of FIG. 6, a first subframe is a normal subframe in which a downlink (that is, access downlink) control signal and data is transmitted from the RN to the UE and a second subframe is an MBSFN subframe in which a control signal is transmitted from the RN to the UE in a control region of the downlink subframe while no signal is transmitted from the RN to the UE in the remaining region of the downlink subframe. Since the legacy UE expects transmission of the PDCCH in all downlink subframes (that is, since the RN needs to enable the legacy UEs within its own area to receive the PDCCH in every subframe so as to perform a measurement function), to enable correct operation of the legacy UEs, it is necessary to transmit the PDCCH in all downlink subframes. Accordingly, even in the subframe (the second subframe) set for transmission of the downlink (that is, the backhaul downlink) from the eNodeB to the RN, the RN needs to transmit the access downlink in first N (N=1, 2 or 3) OFDM symbol intervals of the subframe rather than receiving the backhaul downlink. Since the PDCCH is transmitted from the RN to the UE in the control region of the second subframe, it is possible to provide backward compatibility with the legacy UE served by the RN. While no signal is transmitted from the RN to the UE in the remaining region of the second subframe, the RN may receive a signal transmitted from the eNodeB in the remaining region. Accordingly, the resource partitioning method may prevent the in-band RN from simultaneously performing access downlink transmission and backhaul downlink reception.

The second subframe using the MBSFN subframe is described below in detail. The control region of the second subframe may be considered an RN non-hearing interval. The RN non-hearing interval is an interval in which the RN does not receive a backhaul downlink signal and transmits an access downlink signal. This interval may be set to 1, 2 or 3 OFDM lengths as described above. The RN performs access downlink transmission to the UE in the RN non-hearing interval and performs backhaul downlink reception from the eNodeB in the remaining region. Here, since the RN cannot simultaneously perform transmission and reception in the same frequency band, it takes a certain time to switch the RN from the transmission mode to the reception mode. Accordingly, it is necessary to set a guard time (GT) to allow the RN to switch from the transmission mode to the reception mode in a first portion of the backhaul downlink reception region. Similarly, even when the RN operates to receive the backhaul downlink from the eNodeB and to transmit the access downlink to the UE, a guard time (GT) for switching the RN from the reception mode to the transmission mode may be set. The length of the guard time may be set to a time-domain value, for example, a value of k ($k \geq 1$) time samples Ts or a length of one or more OFDM symbols. Alternatively, in a predetermined subframe timing alignment relationship or in the case in which backhaul downlink subframes of the RN are consecutively set, the guard time of a last portion of the subframes may not be defined or set. Such a guard time may be defined only in a frequency region set for backhaul downlink subframe transmission in order to maintain backward compatibility (where it is not possible to support the legacy UE if the guard time is set in the access downlink interval). The RN can receive a PDCCH and a PDSCH from the eNodeB in the backhaul downlink reception interval excluding the guard time. The PDCCH and the PDSCH may be referred to as an R-PDCCH (Relay-PDCCH) and an R-PDCCH (Relay-PDCCH), respectively, to indicate that the PDCCH and the PDSCH are RN-dedicated physical channels.

The RN's correct awareness of the position of the start or last symbols of an R-PDCCH and an R-PDSCH of the backhaul downlink is closely related to whether or not decoding and demodulation of the channel is successful. The start and end of a backhaul subframe may vary according to the number of R-PDCCHs, the number of PDCCHs, and the timing relationship between transmission and reception.

A time interval (expressed in symbols) in which a backhaul subframe is available or is receivable may be set as in the following four cases according to the timing relationship between the eNB and the RN. First, let us assume that the RN can receive symbols, starting from a symbol of index m and ending with a symbol of index n (13 in the case of the normal CP), which are transmitted in downlink, one subframe starts from a symbol of index 0, and the size of a control region that the RN uses in an access downlink interval is k OFDM symbols.

The first case is where the RN receives a backhaul subframe, starting from a symbol of index m=k+1 and ending with the last symbol (i.e., the symbol of index 13). This corresponds to the case in which the switching time from backhaul link reception to access link transmission is longer than the cyclic prefix (CP) length.

The second case is where the RN receives a backhaul subframe, starting from a symbol of index m=k and ending with the last symbol (i.e., the symbol of index 13). This corresponds to the case in which the switching time from backhaul link reception to access link transmission is shorter than the cyclic prefix (CP) length and the access link transmission timing of the RN matches the backhaul link reception timing.

The third case is where the RN receives a backhaul subframe, starting from a symbol of index and ending with a symbol of index n (n<13), and m and n are determined based on propagation delay and switching time. This corresponds to the case in which the access link transmission timing of the RN is synchronized with the downlink transmission timing of the eNB.

The last case (i.e., the fourth case) is where the RN receives a backhaul subframe, starting from a symbol of index 0 and ending with a symbol of index n (n=13−(k+1)). This corresponds to the case in which the RN receives a general PDCCH rather than an R-PDCCH from the eNB.

In the above cases, a symbol at which transmission of an R-PDCCH and an R-PDSCH actually starts may be signaled in the following manner.

First, it is possible to consider a method in which the start symbol position s1 of an R-PDCCH is fixed to symbol index 3 and the start symbol position s2 of an R-PDSCH in a PRB which does not include an R-PDCCH is individually signaled. Here, s2 has a value in a range of m≤s2≤3 and may be dynamically signaled using an R-PDCCH or may be indicated through higher layer signaling such as RRC signaling. Particularly, in the case of RRC signaling, it is preferable that the start symbol position of the R-PDSCH be signaled to the RN through RRC signaling only when the start symbol position of the R-PDSCH is to be changed. Here, RRC signaling may be RN-specific signaling or may be cell-specific signaling, similar to broadcast information.

It is also possible to consider a method in which both the start symbol position s1 of the R-PDCCH and the start symbol position s1 of the R-PDSCH are indicated through higher layer signaling. Here, it is preferable that s1 and s2 have the same value in a range of m≤s1=s2≤sx, where sx is an integer which is one of 3, 4, and 5.

Figure 7:
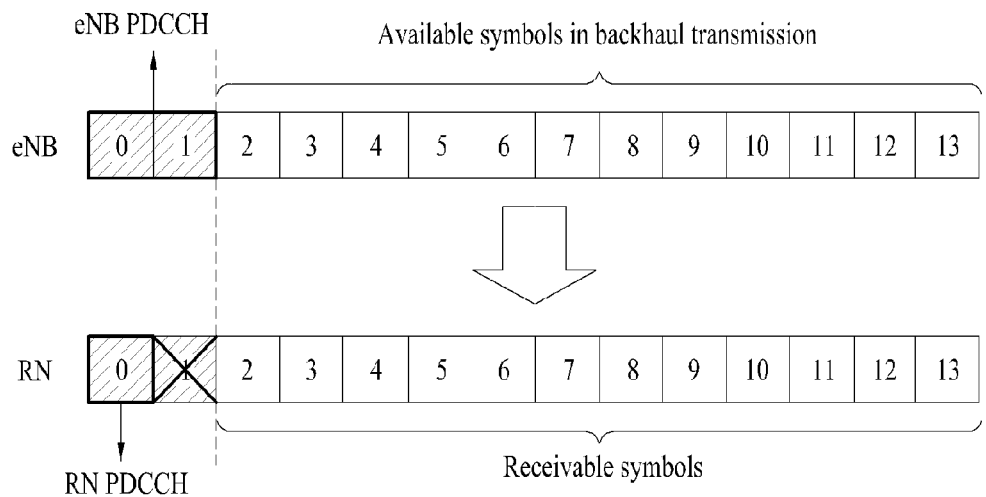
FIGS. 7 and 8 illustrate the number of available symbols for backhaul transmission and the number of symbols receivable by the RN according to the number of PDCCH symbols transmitted from an eNB.
Figure 8:
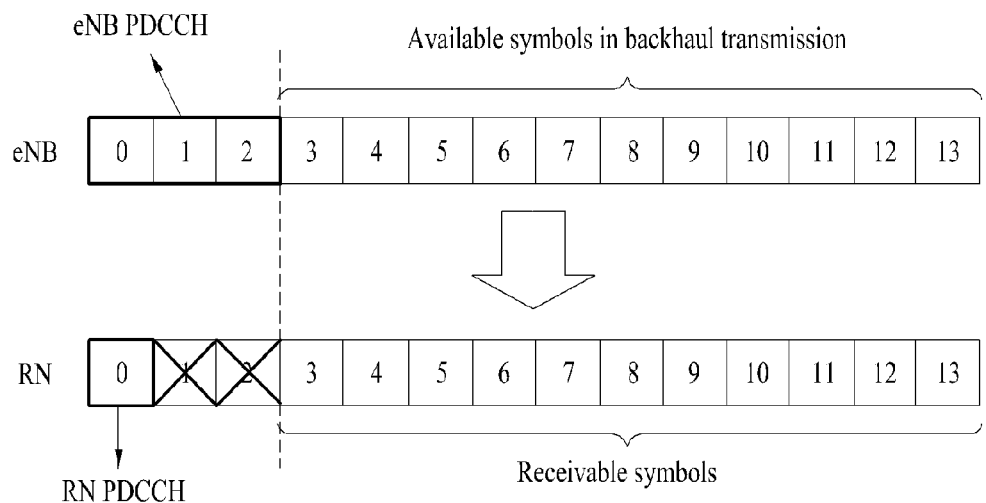

FIGS. 7 and 8 illustrate the number of available symbols for backhaul transmission and the number of symbols receivable by the RN according to the number of PDCCH symbols transmitted from an eNB.

The number of PDCCH symbols of the eNB may be signaled to the RN and UEs and may vary every subframe. Accordingly, symbol index, from which backhaul data (R-PDSCH) or backhaul control information (R-PDCCH) is to be transmitted, may also vary according to the number of PDCCH symbols of the eNB. From the viewpoint of the RN, the numbers of R-PDSCH symbols and R-PDCCH symbols which can be received from the eNB may vary according to the number of PDCCH symbols that the RN transmits to the UE through a Uu interface.

Referring to FIG. 7, a PDCCH of the RN is of 1 symbol and a PDCCH of the eNB is of 2 symbols, the eNB can transmit an R-PDSCH and an R-PDCCH, starting from a symbol of index 2, the RN can receive an R-PDSCH and an R-PDCCH, starting from a symbol of index 2, and a symbol of index 1 can be used for switching. That is, a total of 12 symbols may be used for backhaul transmission.

However, in the case of FIG. 8, a PDCCH of the eNB is of 3 symbols and a total of 11 symbols of indices 3 to 13 are received by the RN. Thus, the number of symbols which can be used for backhaul transmission is reduced from 12 to 11.

Accordingly, it is preferable that the number of symbols used for backhaul transmission be maximized taking into consideration that the number of PDCCH symbols that are transmitted by the eNB and the number of PDCCH symbols that are transmitted by the RN are variable. The following is a description of two main methods for accomplishing this.

In the first method, the eNB transmits an RN-specific signal, as an instruction, to each RN to forcibly designate the number of PDCCH symbols that the RN can use for a Uu interface and the RN then obeys such an instruction of the eNB. This operation may be problematic when the RN has received an instruction to reduce the number of PDCCH symbols of the RN even though the RN is in a state in which it is difficult to reduce the number of PDCCH symbols. A more detailed description is given below with reference to the drawings.

Figure 9:
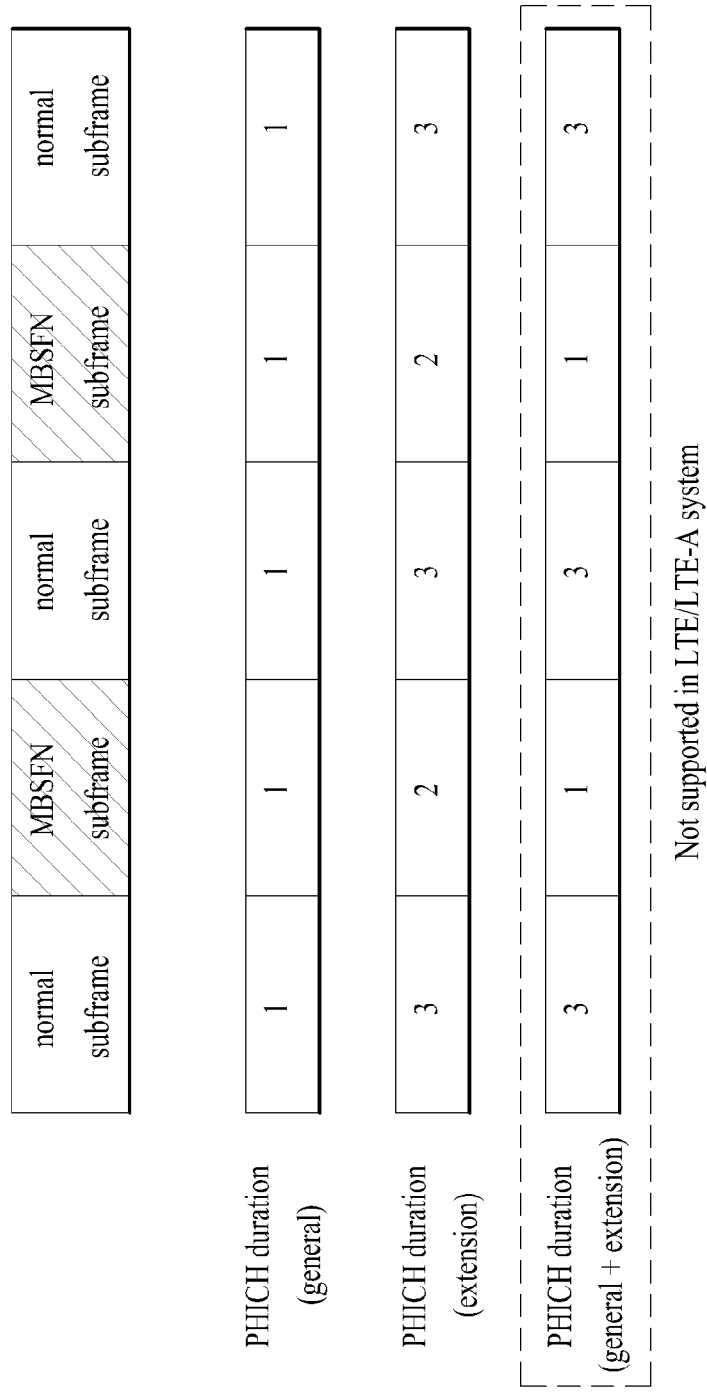
FIG. 9 illustrates a problem that may occur when an eNB forcibly designates the number of PDCCH symbols of an RN.

FIG. 9 illustrates a problem that may occur when an eNB forcibly designates the number of PDCCH symbols of an RN.

Here, let us assume that an extended PHICH duration (i.e., a duration of 3 PDCCH symbols) is used for a normal subframe that is used in a Uu interface which is a link between the RN and a UE and an extended PHICH duration (i.e., a duration of 2 PDCCH symbols) is also used for an MBSFN subframe as shown in FIG. 9. In this case, when the RN has received an instruction to reduce the PHICH duration of an MBSFN subframe for receiving a backhaul subframe from 2 to 1, the RN changes the PHICH duration to a general PHICH duration (i.e., a duration of 1 PDCCH symbol).

However, since information regarding the PHICH duration is transmitted through a master information block (MIB), the PHICH duration cannot be dynamically changed and the PHICH duration is generally kept equal for every subframe for a significant time once the value of the PHICH duration is set. Accordingly, to change the PHICH duration from 2 symbols to 1 symbol, it is necessary to change the PHICH duration from 3 symbols to 1 symbol not only in an MBSFN subframe but also in a normal subframe. That is, it is necessary to apply the same configuration to every subframe regardless of the type of the subframe. Here, forcibly reducing the number of symbols of the PHICH duration of a normal subframe to 1 symbol when the PHICH duration of the normal subframe should be kept at 3 symbols according to cell size, transmission power, the number of controlled UEs, or the like limits operation of the subframe, resulting in imposing restrictions on scheduling.

To alleviate such a problem, it is preferable to employ a recommendation or negotiation procedure rather than the method in which the eNB instructs the RN to change the PHICH duration or to use the number of PDCCH symbols of the RN.

First Embodiment

Figure 10:
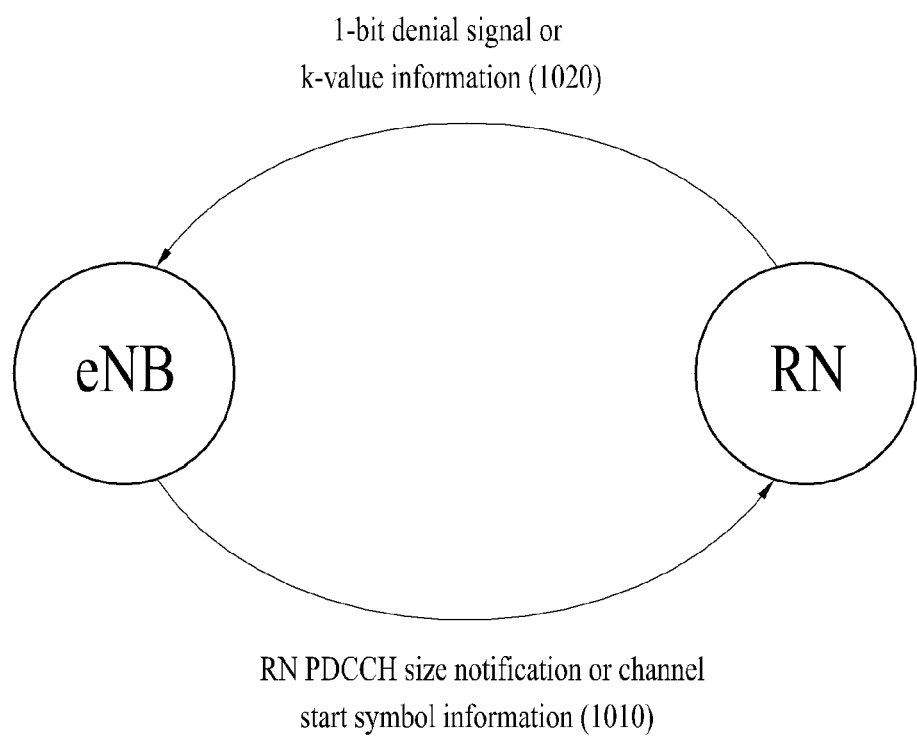
FIG. 10 illustrates a procedure for changing the number of PDCCH symbols of an RN according to a first embodiment of the present invention.

FIG. 10 illustrates a procedure for changing the number of PDCCH symbols of an RN according to a first embodiment of the present invention.

First, the RN designates the number of PDCCH symbols of a Uu interface according to an instruction of the eNB and separately establishes a channel with the eNB, the channel allowing the RN to disobey the instruction of the eNB when obeying the instruction causes a problem. For example, when the RN is in a situation in which it is not possible to reduce the PHICH duration from 3 symbols to 1 symbol although the RN has received, from the eNB, an instruction to reduce the PHICH duration from 3 symbols to 1 symbol, as shown in FIG. 10 (1010), the RN provides information indicating that it is not possible to reduce the PHICH duration to the eNB (1020). Here, the RN may simply transmit PDCCH symbol size (k) as such information or may feed information in a format, which indicates whether the RN has obeyed or disobeyed the instruction of the eNB using 1-bit information, back to the eNB. Such information may be transmitted at regular or irregular intervals. It is also possible to employ a method in which such information is transmitted only in a situation in which the RN has disobeyed the instruction.

Second Embodiment

Figure 11:
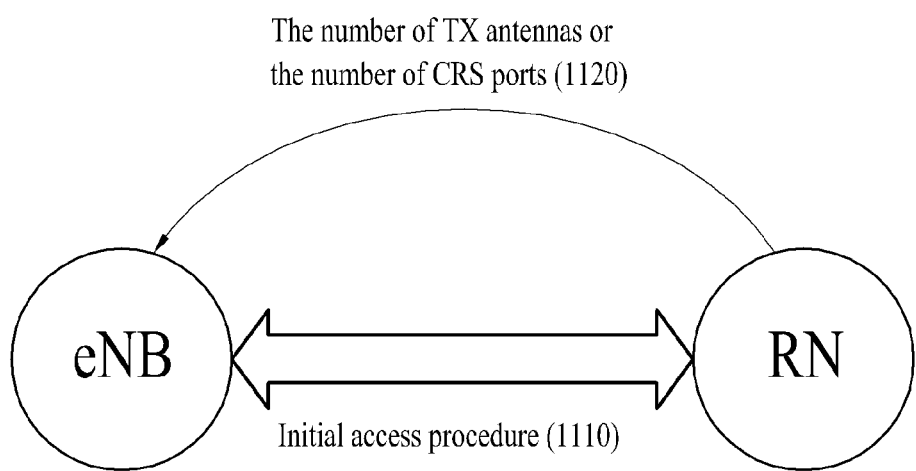
FIG. 11 illustrates a procedure for changing the number of PDCCH symbols of an RN according to a second embodiment of the present invention.

FIG. 11 illustrates a procedure for changing the number of PDCCH symbols of an RN according to a second embodiment of the present invention.

Change in the number of transmit antennas or the number of antenna ports for a cell-specific reference signal (common reference signal (CRS)) may be considered the biggest reason why the RN changes the PDCCH size of the Uu interface. That is, the number of PDCCH symbols may be determined to be 1 or 2 according to whether the number of antennas (or antenna ports) is 2 or 4.

Generally, the number of PDCCH symbols is determined in a UE mode (i.e., an initial access step) in which the RN performs a procedure for making random access to the eNB. In addition, it is essential for the RN to provide the eNB with essential information regarding operation of the Uu interface. Accordingly, the present invention suggests that, in a procedure (1110) in which the RN transmits capability information of the RN when making initial access to the eNB as shown in FIG. 11, the RN transmit, together with the capability information, information regarding the number of transmit antennas (or antenna ports for CRS) that are used in the Uu interface of the RN (1120).

Third Embodiment

Figure 12:
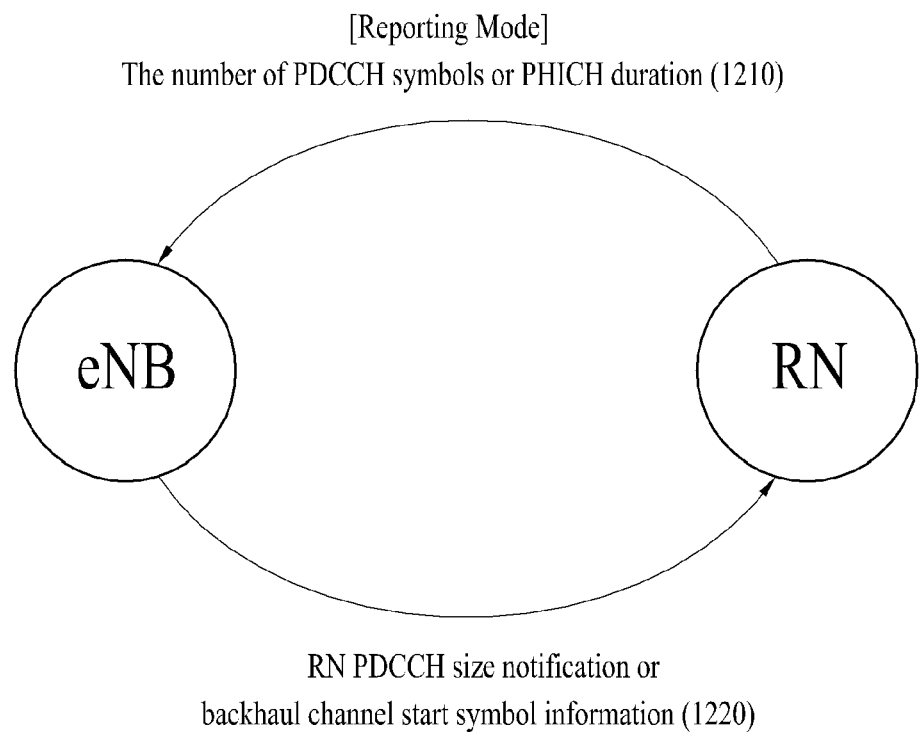
FIG. 12 illustrates a procedure for changing the number of PDCCH symbols of an RN according to a third embodiment of the present invention.

FIG. 12 illustrates a procedure for changing the number of PDCCH symbols of an RN according to a third embodiment of the present invention. The third embodiment of the present invention is characterized in that there is a reporting mode in which the RN preferentially reports, to the eNB, the number of PDCCH symbols (or the PHICH duration) of the Uu interface which are preferred or which are scheduled to be used at a later time. The third embodiment has an advantage in that it is possible to support as many symbols that can be received by the RN as possible.

Referring to FIG. 12, the RN performs the reporting mode at regular intervals or when a specific event has occurred to report, to the eNB, the number of PDCCH symbols (k) or a PHICH duration which is to be used by the RN (1210). The eNB may transmit a confirmation response, which allows the RN to use the reported value, in response to the report of the RN or may determine a start symbol position (Si) of an R-PDCCH or a start symbol position (s2) of an R-PDSCH in a PRB which does not include an R-PDCCH based on the reported value and may then signal the determined start symbol position to the RN (1220). It is also possible to employ a method in which the eNB signals a start symbol index and a last symbol index of a backhaul subframe which can be received by each RN.

Figure 13:
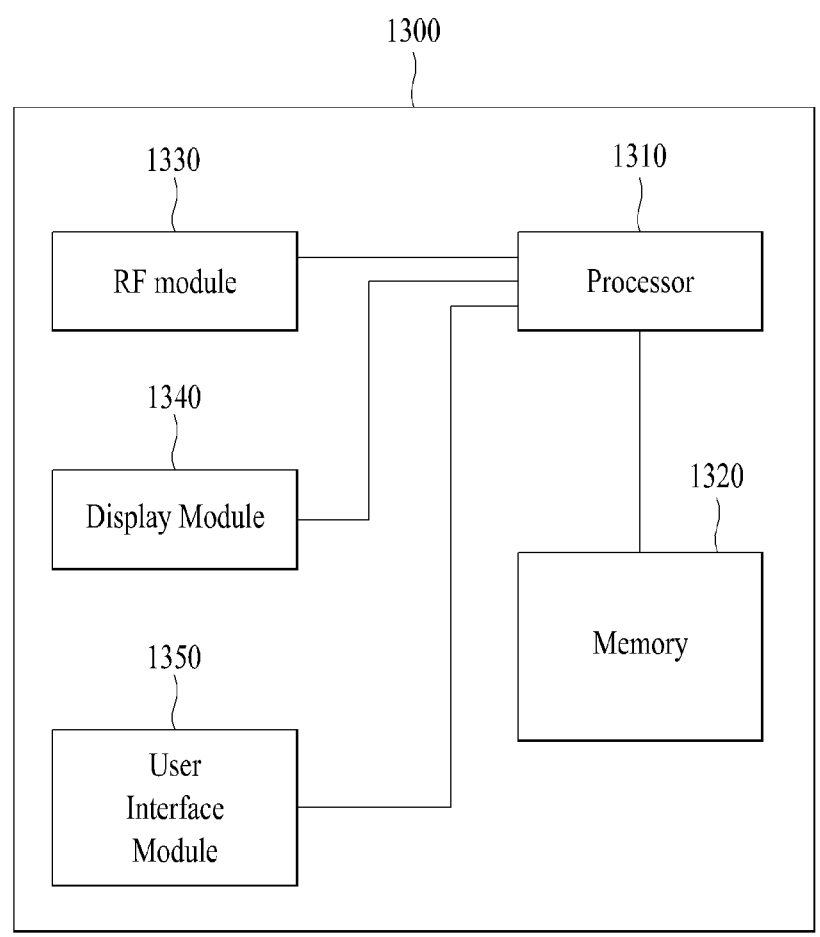
FIG. 13 is a block diagram of a communication device according to an embodiment of the present invention.

FIG. 13 is a block diagram of a communication device according to an embodiment of the present invention.

As shown in FIG. 13, a communication device 1300 includes a processor 1310, a memory 1320, an RF module 1330, a display module 1340, and a user interface module 1350.

The communication device 1300 is illustrated for ease of explanation and some modules of the communication device 1300 may be omitted. The communication module 1300 may further include required modules. Some modules of the communication device 1300 may be subdivided into more specific modules. The processor 1310 is configured to perform operations according to the embodiments of the present invention which are described above with reference to the drawings. For detailed operations of the processor 1310, reference can be made to the descriptions of FIGS. 1 to 12.

The memory 1320 is connected to the processor 1310 and stores an operating system, applications, program code, data, and the like. The RN module 1330 is connected to the processor 1310 and functions to convert a baseband signal into a radio signal or to convert a radio signal into a baseband signal. To accomplish this, the RF module 1330 performs analog conversion, amplification, filtering, and frequency up-conversion or performs reversal of these processes. The display module 1340 is connected to the processor 1310 and displays a variety of information. The display module 1340 may include but not limited to well-known elements such as a Liquid Crystal Display (LCD), a Light Emitting Diode (LED), or an Organic Light Emitting Diode (OLED). The user interface module 1350 is connected to the processor 1310 and may be constructed of a combination well-known user interfaces such as a keypad and a touchscreen.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a relay node and a Base Station (BS) (eNode B or eNB). Specific operations which have been described as being performed by the BS may also be performed by an upper node as needed. That is, it will be apparent to those skilled in the art that the BS or any other network node may perform various operations for communication with terminals (or User Equipment) in a network including a number of network nodes including BSs. The term "base station (BS)" may be replaced with another term such as "fixed station", "Node B", "eNode B (eNB)", or "access point".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

Although the method and apparatus for setting a backhaul subframe between a base station and a relay node in a wireless communication system have been described above mainly with reference to examples which are applied to the 3GPP LTE system, the present invention can be applied to various multi-antenna wireless communication systems other than the 3GPP LTE system.

The invention claimed is:

1. A method for a relay node to receive a signal from a base station in a wireless communication system, the method comprising:
   receiving, through a first link from the base station, a request signal for changing a size of a downlink physical control channel that is transmitted through a second link from the relay node to a user equipment corresponding to the relay node;
   transmitting a response signal through the first link to the base station in response to the request signal;
   configuring one or more downlink available symbols for the first link based on the request signal; and
   receiving, through the first link using the one or more downlink available symbols, a relay node specific signal from the base station,
   wherein the request signal includes information on a Physical Hybrid-ARQ Indicator CHannel (PHICH) duration of a subframe of the second link.

2. The method according to claim 1, wherein the response signal is 1-bit information indicating whether the size of the downlink physical control channel is changed or not.

3. The method according to claim 1, wherein the response signal includes information on a number of antenna ports for a common reference signal allocated to a subframe of the second link.

4. The method according to claim 1, wherein a normal subframe and a Multicast Broadcast Single Frequency Network (MBSFN) subframe are alternately configured as a subframe of the second link.

5. The method according to claim 2, wherein a predetermined number of downlink available symbols are maintained when the response signal indicates that the size of the downlink physical control channel is not changed.

6. A relay node in a wireless communication system, the relay node comprising:
   a wireless communication module for communicating with a base station through a first link and communicating with a user equipment corresponding to the relay node through a second link; and
   a processor for processing a signal that is transmitted or received through the first link and a signal that is transmitted or received through the second link,
   wherein the wireless communication module receives, from the base station, a request signal for changing a size of a downlink physical control channel that is transmitted through the second link and transmits a response signal through the first link to the base station in response to the request signal,
   the processor configures one ore more downlink available symbols for the first link based on the request signal, and
   the wireless communication module receives a relay node specific signal through the first link, using the one or more downlink available symbols, and
   wherein the request signal includes information on a Physical Hybrid-ARQ Indicator CHannel (PHICH) duration of a subframe of the second link.

7. The relay node according to claim 6, wherein a normal subframe and a Multicast Broadcast Single Frequency Network (MBSFN) subframe are alternately configured as a downlink subframe of the second link.

* * * * *